United States Patent [19]
Darling

[11] Patent Number: 4,965,554
[45] Date of Patent: Oct. 23, 1990

[54] MOISTURE PRESENCE ALARM SYSTEM

[76] Inventor: John E. Darling, 45 Morley Road, Twickenham, Middlesex, Great Britain

[21] Appl. No.: 457,714
[22] PCT Filed: Jul. 21, 1988
[86] PCT No.: PCT/GB88/00598
 § 371 Date: Jan. 19, 1990
 § 102(e) Date: Jan. 19, 1990
[87] PCT Pub. No.: WO89/00681
 PCT Pub. Date: Jan. 26, 1989

[30] Foreign Application Priority Data

Jul. 21, 1987 [GB] United Kingdom ............... 8717235

[51] Int. Cl.$^5$ ............................................. G08B 21/00
[52] U.S. Cl. ................................. 340/604; 324/557; 73/40
[58] Field of Search ............... 340/604, 605, 603; 324/557, 693; 73/40

[56] References Cited

U.S. PATENT DOCUMENTS 4,110,945 9/1978 Sheahan ..................... 340/604 X
4,404,516 9/1983 Johnson, Jr. ................ 340/605 X

FOREIGN PATENT DOCUMENTS 36650 9/1886 Fed. Rep. of Germany.
3011500 10/1981 Fed. Rep. of Germany.
3333542 4/1985 Fed. Rep. of Germany.
3544264 6/1987 Fed. Rep. of Germany.
1212327 3/1960 France.
1543156 3/1979 United Kingdom.

OTHER PUBLICATIONS

"Plant Moisture-Detector is Self-Checking", *Electric World*, Jun. 15, 1972, pp. 34-35.
"Dissolving Paper Triggers Leak Sensor", *Machine Design*, Feb. 10, 1972, p. 115.

*Primary Examiner*—Joseph A. Orsino
*Assistant Examiner*—Jeffery A. Hofsass
*Attorney, Agent, or Firm*—Amster, Rothstein & Ebenstein

[57] ABSTRACT

A moisture presence alarm system has a sensor system which extends over an area to monitored and a detector device which receives signals from the sensor system. This has spatially separated conductors in contact with a moisture absorbent material. The position of the leak is determined by selective interrogation of pairs of conductors. The conductors may be in an orthogonal matrix (A1 ... X1 ... A2 ... X2), each conductor (10,11) being associated with a moisture absorbent strip (12,13).

9 Claims, 1 Drawing Sheet

MOISTURE PRESENCE ALARM SYSTEM

This invention relates to a moisture presence alarm system, in particular for the roofs of buildings, but also for other purposes such as beneath a swimming pool.

Particularly modern flat roofs are prone to rainwater leakage which can have very serious effects even if the leakage is only slight. Not only can the fabric of the building be damaged, wood become rotten and plaster be damaged, but, when business premises are involved, the consequential losses due to disruption caused by reinstatement and repair can be substantial. Moreover, if the building houses sensitive equipment, such as computers, this may be physically damaged and the disruption caused by repairs can be even greater.

Alarm systems have been known (DE-PS 36650, US-PS 450244) in which changes of impedance between two conductor nets have been used to signal a moisture leak. US-PS 4110945 discloses locating the position of a leak within an area to be monitored by separately positioning a number of detectors at specific points in the area. However, the latter system is expensive if the number of detectors is large enough to make location accurate. Other systems locate leaks by calculating the distance along a pair of wires to the point where a conductivity change has occurred.

The invention aims to provide a system which is cheap and simple to install and easy to monitor, while enabling a high degree of discrimination as to the location of a leak.

Accordingly, the invention proposes a moisture leak alarm system having a sensor system which extends over an area to be monitored, and a detector device which receives signals from the sensor system, the latter comprising spatially separated conductors in conductive contact with a moisture absorbent material, characterised in that the sensor system comprises a first set of generally parallel conductors extending in one direction on one side of the moisture absorbent material, and a second set of generally parallel conductors arranged transversely of said direction on the other side of the material, wherein the conductors of at least one set are attached to moisture absorbent strips, and wherein the conductors are electrically independent, forming a matrix such that each conductor of each set forms a conductor pair at their respective crossing points and the conductors are narrow compared with the spacing between them; and in that the detector device detects changes in electrical conditions between said pairs, the position of any leak within said area being determined by selective interrogation of the respective pairs of conductors.

Preferably, each electrical conductor comprises a moisture absorbent strip carrying on one side a single conductor in the form of a tape applied to the strip so as to be in conductive contact therewith.

In order that the invention shall be clearly understood, several exemplary embodiments thereof will now be described with reference to the attached drawings, in which.

Figure 1:
FIG. 1 shows a moisture leak alarm sensor system.

FIG. 1 shows a matrix of longitudinal wires identified A1, B1, ... X1, and transverse wires identified A2, B2, ... X2, position on a roof surface before the waterproof covering e.g. tiles or felt, is put on.

The wires 10,11 in each case are uninsulated and are attached, e.g. by gluing, to a strip of moisture absorbent material 12,13 respectively along its centre line. The material 12,13 may be similar to bandage, or any other suitable material, provided it can absorb moisture. It has also the function of allowing easier handling of the wire, and it can be itself stuck to the roof surface to keep the wires in place. The strip with wire attached is provided for use in rolls.

Each wire at one end is ready for connection to the monitoring circuit, and the other end is free. The matrix spacing and size is chosen to match the size of the area to be monitored and the degree of accuracy required in pinpointing any moisture Every crossing point represents a detector location (576 in the present example).

Figure 2:
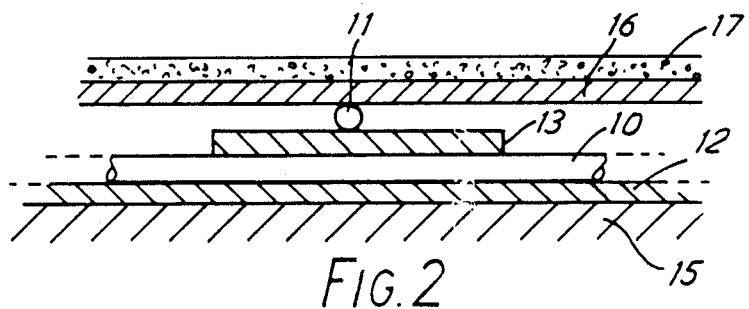
FIG. 2 shows a cross-section through a wire crossing point of the sensor system laid in a roof.

FIG. 2 shows a section through such a crossing point, to a much larger scale. The roof surface 15 has the longitudinal wire 10 on its strip 12 lying upon it. The strip may be glued to the surface. At right angles and above this is the transverse wire 11 on its strip 13. The whole matrix is then covered by the waterproof roofing material, represented by layers 16, 17.

In the event of a leak occurring, the moisture will come in contact with the strip 12 and/or 13 and be absorbed. It will then travel through the material until it reaches an area of strip 13 which lies directly between wires 10 and 11. This breaks down the insulation between the two and the leak can then be detected as conduction between at least two crossing wires of the matrix. It can be seen that the material strip 12 is not essential, but may help the moisture to reach the crossing point more quickly.

The terminations of the wires A1 to X1, A2 to X2 are carried to a detector unit. The latter 'reports' by a cable or radio connection to a master control unit which may include a modem for carrying out an immediate alarm call by telephone.

Wires A1 to X1 can be supplied in turn with +12V. For each one, the voltage is measured in turn on wires A2 to X2. If the voltage is other than 0V, there must be conduction at the crossing point of the two wires involved, thus pinpointing moisture there. An alarm signal is then transmitted to the master unit. The switching of the voltage and sensing connections sequentially through all possible combinations is preferably effected under software control. An additional check can be included in the sequencing, by reducing voltage on wires A1 to X1 to 0V and checking that no alarm signal occurs. Any alarm occurring is indicated as the number of the matrix crossing point on an LED display of the master control unit.

In a modification, provision may be made for connections to both ends of conductors so that a continuity check can be performed.

In addition to the moisture detector array, there may be a number of pressure sensitive pads included, either with separate wiring or wired to the matrix, under the roof finish. These can be used to detect unauthorised access to the roof. Also, more than one detector array may be provided, for example below a further impermeable layer, so as to detect condensation within a building.

In practice, a wire adhered to an absorbent strip is not the easiest material to produce or handle, and the wire tends to be unduly thick. A better alternative is a metallic tape attached along an absorbent strip.

Figure 3:
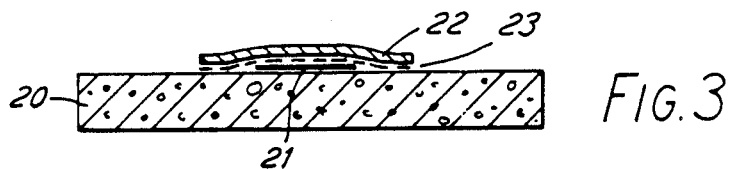
FIG. 3 shows a cross-section of an electrical conductor strip.

An example of such a conductor is shown in FIG. 3. A porous or fibrous strip 20 (seen in cross-section) has along its top surface a conductor tape 21 which is in direct contact with that surface. This is held in place by a cover layer 22 with an adhesive layer 23, in practice an adhesive tape. For assembly purposes, the conductor tape 21 may itself be in the form of a metallised adhesive tape stuck adhesive-to-adhesive to the cover layer 22. The cover layer 22 protects and strengthens the conductor tape.

A further possibility is to use an absorbent strip which is of close enough texture to receive a conductive coating deposited directly upon it by any suitable means, for example vacuum deposition, solder dip, or a continuous printing process using an aluminium or graphite paint.

The first (lowermost) set of parallel conductors can most simply be provided by an adhesive tape in which the adhesive is on the lower side and a conductive layer is on the upper side, without a moisture absorbing strip attached.

The moisture absorbent strip may use any material, such as cotton, jute, cellulose or synthetic material. It should be rot and vermin proof, so synthetic fibres e.g. glass-fibre, are attractive for this purpose. It will most commonly be fibrous.

Depending on the spacing required between conductors two or more discrete parallel conductors may be applied to a single base strip. With appropriate dimensioning, base strips could be laid abutting side by side to cover a whole surface. Given a suitably bulky material, this could provide a full insulating layer over the surface for additional heat insulation.

In an improvement of the system, the master control unit can be pre-set so that a certain level of conductivity at any node will be ignored, thus forming a threshold below which a leak alarm will not be generated. This may be applied to the whole roof area, to a certain lesser area, or to a particular node or nodes. This is useful when a matrix has been installed in a new building which is itself still drying out. During that period, there may be sufficient 'internal' moisture to trigger the system, so a higher threshold can be set. In an extreme case, there could be a short at one node, so the unit can be set to ignore all signals from that node. This would save the need to repair the matrix at that point.

The systems described are of utility not just for roofs, but also for intermediate floors of a building, for swimming pools, and for other purposes.

I claim:

1. A moisture presence alarm system having a sensor system which extends over an area to be monitored, and a detector device which receives signals from the sensor system, the latter comprising spatially separated conductors in contact, with a moisture absorbent material, characterised in that the sensor system comprises a first set of generally parallel conductors extending in one direction on one side of the moisture absorbent material, and a second set of generally parallel conductors arranged transversely of said direction on the other side of the material, wherein the conductors of at least one set are attached to moisture absorbent strips, and wherein the conductors are electrically independent, forming a matrix such that each conductor of each set forms a conductor pair at their respective crossing points and the conductors are narrow compared with the spacing between them; and in that the detector device detects changes in electrical conditions between said conductor pairs when a change in moisture occurs in the sensing area, the position of any leak within said area being determined by selective interrogation of the respective pairs of conductors.

2. A system as claimed in claim 1 wherein each set of conductors is orthogonal to the other.

3. A system as claimed in claim 1 wherein each strip is rot-proof.

4. A system as claimed in claim 1 wherein each conductor has the form of a tape applied to a strip so as to be in contact therewith.

5. A system as claimed in claim 1 wherein two independent conductors lie parallel to one another on the same side of one of said moisture absorbent strip, and said strips are positioned adjacent one another so as to cover said area to be monitored.

6. A system as claimed in claim 1 wherein the detector device can be pre-set with a threshold in respect of the signal from any specific conductor pair so that spurious leak signals can be eliminated.

7. A system as claimed in claim 6 wherein said threshold can be set so high said specific any signal from that conductor pair is ignored completely.

8. A system as claimed in claim 1 wherein each conductor has the form of an adhesive tape, with adhesive on one side and a conductive layer on the other.

9. A system as claimed in claim 1 wherein each set of conductors is orthogonal to the other; each strip is rot-proof; two independent conductors lie parallel to one another on the same side of one of said moisture absorbent strips, and said strips are positioned adjacent one another so as to cover said area to be monitored; the detector device can be pre-set with a threshold in respect f the signal from any specific conductor pair so that spurious leak signals can be eliminated, and said threshold can be set so high said specific any signal from that conductor pair is ignored completely; and each conductor has the form of an adhesive tape, with adhesive on one side and a conductive layer on the other, said adhesive being applied to a strip so that said layer is in conductive contact therewith.

* * * * *